H. W. OWEN.
SHOCK ABSORBER.
APPLICATION FILED JUNE 11, 1913.
1,116,474.
Patented Nov. 10, 1914.
Fig. 1.
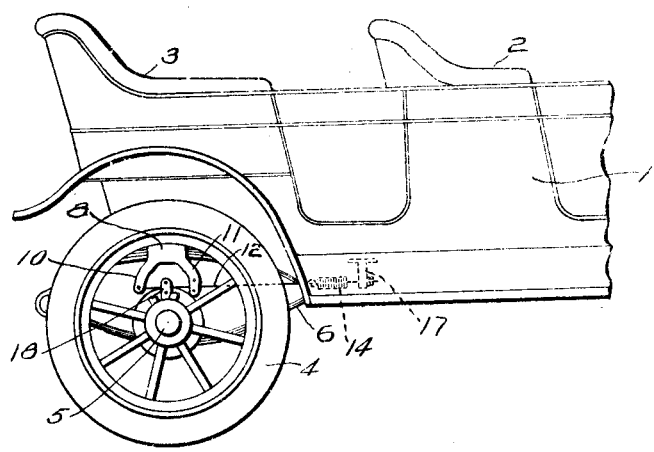
Fig. 2.
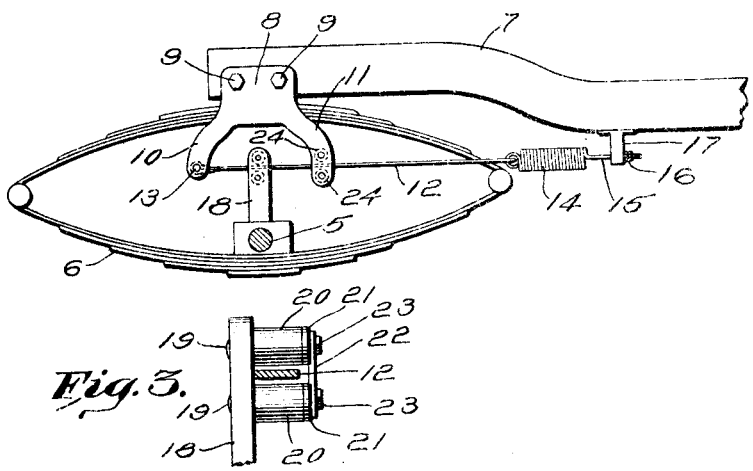
Fig. 3.
Witnesses
Roswell F. Hatch
Beatrice T. Smith
Inventor
Herbert W. Owen
by R. P. Harris
atty.

UNITED STATES PATENT OFFICE.

HERBERT W. OWEN, OF DOVER, NEW HAMPSHIRE.

SHOCK-ABSORBER.

1,116,474.   Specification of Letters Patent.   Patented Nov. 10, 1914.

Application filed June 11, 1913. Serial No. 773,002.

*To all whom it may concern:*

Be it known that I, HERBERT W. OWEN, a citizen of the United States, residing in Dover, county of Strafford, and State of New Hampshire, have invented an Improvement in Shock-Absorbers, of which the following description, in connection with the accompanying drawings, is a specification, like letters on the drawings representing like parts.

The invention to be hereinafter described relates to automobiles or other vehicles, and more particularly to means for absorbing or nullifying the shocks and vibrations transmitted to the body as the automobile or vehicle passes over the road. Devices of this character are known as "shock absorbers" and various attempts have been made heretofore to produce a device of this general character that would be effective in easing the shock transmitted to the passengers, especially in traversing rough or uneven roads, but in all such prior attempts serious defects have been found to exist and the said devices have either failed in the accomplishment of their full purpose, or have introduced other objections.

The aims and purposes of the present invention are to provide a shock absorber for use in connection with automobiles and other vehicles, which shall be simple in construction, efficient in absorbing shocks and vibrations in operation, and readily and easily adaptable to any ordinary vehicle, all as will appear from the following drawings and accompanying description of one form of means for carrying the invention into practical effect, it being understood that the actual invention is not restricted to the particulars and details shown, but that it may be varied and modified within the true scope of the invention as defined by the claims.

In the drawings:—Figure 1 is a side elevation of sufficient of the rear part of a vehicle or automobile to show the invention applied thereto; Fig. 2 is an enlarged detail in side elevation, showing one convenient way of applying the invention; and Fig. 3 is a further detail view showing the rollers carried on one of the projections and the flexible strap in its normal relation thereto.

For convenience of description, the invention will be described in connection with an automobile, and as disposed in longitudinal relation therewith, but it is of course to be understood that the invention is equally applicable to other vehicles and that it may be arranged in other relations than longitudinally of the same, all of which will hereinafter more fully appear.

The part 1 may be of the usual or any desired form of body, having the seats 2 and 3, and mounted upon a suitable running gear including the wheels 4 and axles 5, all of which may be as usual. In the present illustration, only a portion of the running gear is shown for the purpose of avoiding complication, and as its particular structure is not of the essence of the invention and is well understood by those skilled in the art further elucidation thereof by drawings and description is unnecessary. Between the running gear and the body 1 are interposed springs, as usual, for easing the shocks and vibrations transmitted to the body from the wheels as the vehicle or automobile passes over the road. In the present instance, one of these springs is indicated at 6, but it is to be understood that so far as the invention is concerned the springs interposed between the running gear and body may be of any form or type, and that they may be secured in any appropriate way to the body and running gear, all as well understood. The springs, however, must be sufficiently stiff to properly support the load carried by the body, so that as the wheels travel over the road and rise or fall in conformity with the road bed, the springs transmit these motions either with too much rigidity or on the other hand with too much elasticity. In any event, much discomfort is experienced by those riding in that automobile, and the aims and purposes of the present invention contemplate means to overcome or minimize the sudden shocks and vibrations transmitted to the body of the vehicle. As one form of means to this end the action of the usual springs is supplemented by a flexible strap which is brought into action by the relative rising or falling movements of the running gear and body to yieldingly overcome such relative movements, as will now be explained in connection with the illustrated construction which presents a simple and convenient form of the invention.

Mounted on the body of the automobile or vehicle, preferably upon one of the longitudinal floor beams 7 thereof, is a projection or drop hanger 8 which may be secured to said beam by appropriate means such as the bolts indicated at 9. The projection or drop hanger 8 may be variously formed but in the illustrated construction it is provided with two arms 10 and 11 with a space between. To one of the arms as 10, is fixedly secured at 13, one end of a flexible strap 12, the other end of said flexible strap being connected to the body of the vehicle by means of a spring 14, the end portion 15 whereof may be properly threaded to engage the nuts 16 after the end 15 of the spring has passed through the lug or drop hanger 17 secured to the body of the vehicle or automobile. Obviously the spring may be adjusted to properly tension the strap 12 and while the illustrated construction presents a good practical form of this feature of the invention, it is to be understood that the spring might be otherwise arranged with respect to the flexible strap, the essential in this respect being that a spring be employed in connection with the flexible strap to maintain the strap under proper tension, preferably adjustable.

Rising from the running gear of the automobile or vehicle and properly secured thereto by appropriate means, is a riser 18 which projects upwardly between the two arms 10 and 11 of the drop hanger. In the present illustration of the invention, the riser is shown as being maintained between the arms 10 and 11, but this is of course not essential, as will later appear.

Projecting laterally from the riser 18 are the supporting bolts 19, 19 carrying the rollers 20, 20, separated somewhat as indicated by Fig. 3 and adapted to contain between them the running portion of the flexible strap 12. As indicated by Fig. 3, it will be noted that the space between the rollers 20 is greater than the thickness of the flexible strap 12 and that the flexible strap, thus in normal condition of the parts, is not in engagement with either one of the rollers 20. The rollers 20 may be maintained upon the supporting studs 19 in any appropriate manner, as by the cap-pieces 21, 21, and in order to prevent the strap 12 from becoming disarranged with respect to the rollers 20, as indicated in Fig. 3, that is to prevent the strap from moving out from between the two rollers, there is preferably secured to and extending between the free end portions of the supporting studs 19, a limiting plate or bar 22, which may be secured to the ends of the studs 19 by appropriate means such as the nuts 23.

The construction thus far described with respect to the flexible strap and its location between the appropriate projecting portions connected to the running gear may be varied and modified in form, the essentials in this respect being that the flexible strap intermediate its end portions shall pass between the projections secured to the running gear, so that upon relative movement of the body of the automobile and running gear in a vertical direction, the flexible strap will be caused to engage one or the other of these projections and be bent by it and then react to limit or overcome such relative vertical movement of the body and running gear by a yielding action.

The arm 11 of the drop hanger 8 is likewise provided with projections carrying suitable rollers 24 similar to those described with respect to the riser 18. The rollers 24 in the arm 11 of the drop hanger are also disposed one above and one below the strap 12 between its end portions and, like the construction described for the riser 18, the strap 12 may be retained in the studs between the rollers 24 by an appropriate detachable confining plate.

From the construction described, it will be apparent that in passing over the road the springs 6 interposed between the running gear and the body of the vehicle will act as usual to yieldingly support the body, and as the vehicle passes over the road the running gear and body will, owing to the uneven character of the road, be subjected to relative vertical movements which will vary in their abruptness, according to the varying character of the road-bed. As the running gear and body thus move relatively in a vertical direction, it will be seen that the strap 12 will be engaged by one or the other of the projections or rollers on the riser and on the arm 11 of the drop hanger, thereby deflecting the tensioned belt 12 in proportion to the relative vertical movements of the body and running gear. Since the bend thus given to the flexible strap must act through the tensioning means or spring 14, it is apparent that such relative vertical movement of the body and running gear either upward or downward, will be yieldingly absorbed or overcome so that the occupants of the vehicle or automobile will be relieved of the discomfort due to the sudden change in direction ordinarily occurring under the use of spring 6 between the running gear and body.

It will be noted in its preferable form the invention contemplates that the flexible strap 12 intermediate its ends shall be out of engagement with the projections or rollers 20 from the body and running gear, so that the springs interposed between the body and running gear may assert without hindrance their usual functions to a limited extent, but should they transmit undue vibrations, such as are incident in going over a rough road, the projections or rollers 20 will at once engage the flexible strap 12 and by bending it reversely between the riser and arm 11 of the drop hanger, will yieldingly absorb the undue shocks and vibrations. It will be apparent also that while the invention may be conveniently and readily associated with an automobile, of any construction, by the simple devices hereinbefore described, such devices do not require any modification in the automobile construction, but may be applied readily by any one ordinarily skilled in mechanical matters. It will also be apparent that while the invention, as illustrated, shows the flexible strap extending longitudinally and drop hanger provided with the two arms secured to the body with a single riser projecting from the running gear, this arrangement may be varied and different forms of construction may be provided for supporting the flexible strap so that intermediate portions thereof shall pass between the projections extending from the body and running gear and act yieldingly upon the relative vertical movements of the body and running gear to overcome said movements, in all of which respects the invention in its true scope is defined by the claims.

What is claimed is:—

1. In a shock absorber for automobiles, the combination of the running gear, a body mounted thereon, springs interposed between the running gear and body, a flexible strap, means for holding said strap under tension, projections carried by the running gear and body and normally out of contact with said strap, said projections being brought into engagement with said flexible strap between the end portions thereof to deflect an intermediate portion of said strap in opposite directions by relative vertical movement of said running gear and body to yieldingly overcome said vertical movement.

2. In a shock absorber for automobiles, the combination of the running gear and body, a projection extending from each of said parts, springs for supporting said body from the running gear, a spring tensioned flexible strap secured to one of said parts and passing between and normally out of contact with the projections on the running gear and body, said projections being brought into engagement with said flexible strap between its ends by abnormal relative vertical movement of said running gear and body to yieldingly overcome such relative vertical movement.

3. In a shock absorber for automobiles, the combination of a running gear and body, springs interposed between the running gear and body for supporting the latter, a flexible and tensioned strap secured to one of said parts, projections carried by both the body and running gear and normally out of contact with said flexible strap, opposite projections of each pair being brought into engagement with said flexible strap to deflect adjacent portions of said flexible strap in reverse directions by relative vertical movements of said running gear and body to yieldingly overcome said relative movements.

4. In a shock absorber for automobiles, the combination of a body and running gear, springs for supporting the body, a flexible strap secured to the body, a drop hanger carried by the body and having portions disposed above and below the strap, a riser extending from the running gear adjacent to the drop hanger and having portions disposed above and below the strap, and means for tensioning the strap.

5. In a shock absorber for automobiles, the combination of a body and running gear, springs for supporting the former from the latter, a flexible strap, means for supporting the end portions of the strap, means for placing the strap under tension, a drop hanger extending from the body and having rollers one above and one below the strap, and a riser extending from the running gear and having rollers, one above and one below the strap adjacent the rollers of the drop hanger, said rollers acting on said flexible strap to deflect it in reverse directions by relative vertical movement of the body and running gear to yieldingly overcome such relative movements.

6. In a shock absorber for automobiles, the combination of a body and running gear, springs for supporting the body from the running gear, a flexible strap extending substantially in a horizontal direction, a spring for placing said strap under tension, arms extending from the body and running gear toward each other and having overlapping end portions, and projections extending from the overlapping portions of said arms above and below the flexible strap to engage and reversely bend the flexible strap upon relative vertical movement of the running gear and body.

7. In a shock absorber for automobiles, the combination of a body and running gear, springs for supporting the body from the running gear, a flexible strap extending substantially in a horizontal direction, a spring for placing said strap under tension, arms extending from the body and running gear toward each other and having overlapping end portions, projections extending from the overlapping portions of said arms above and below the flexible strap to engage and reversely bend the flexible strap upon relative vertical movement of the running gear and body, and means to retain the strap between said projections.

In testimony whereof, I have signed my name to this specification, in the presence of two subscribing witnesses.

HERBERT W. OWEN.

Witnesses:
ALMIE M. JENNESS,
DWIGHT HALL.